Oct. 18, 1949.　　　　M. E. BISHOP　　　　2,485,473
TRAILER SUPPORTED CANOPY
Filed Nov. 21, 1946　　　　　　　　　　　3 Sheets-Sheet 1
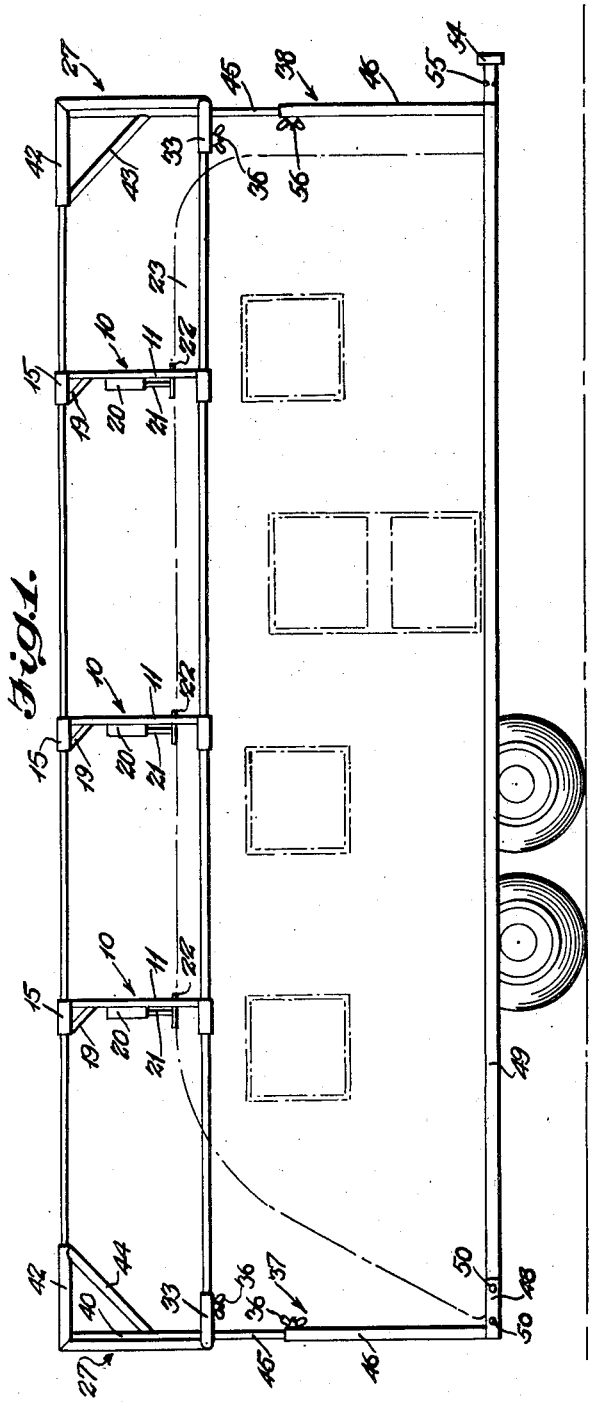
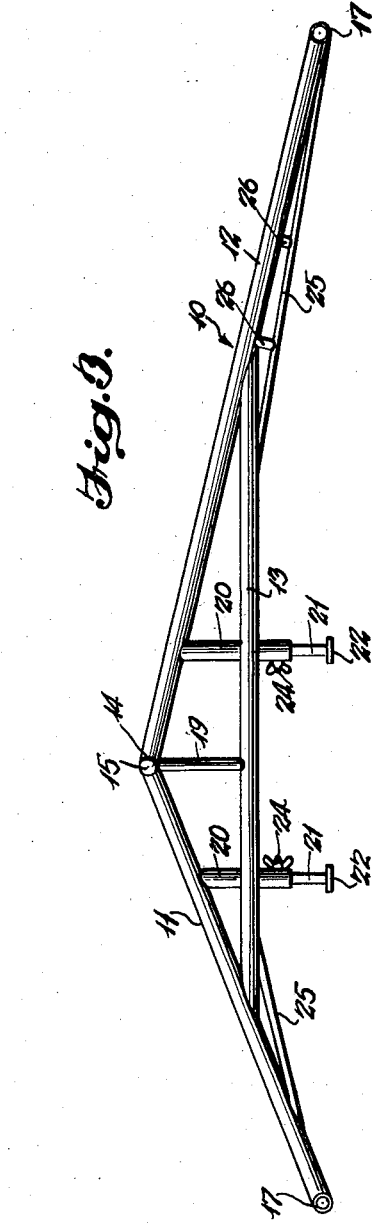
INVENTOR.
*Maurice E. Bishop*,
BY *Victor J. Evans & Co.*
ATTORNEYS

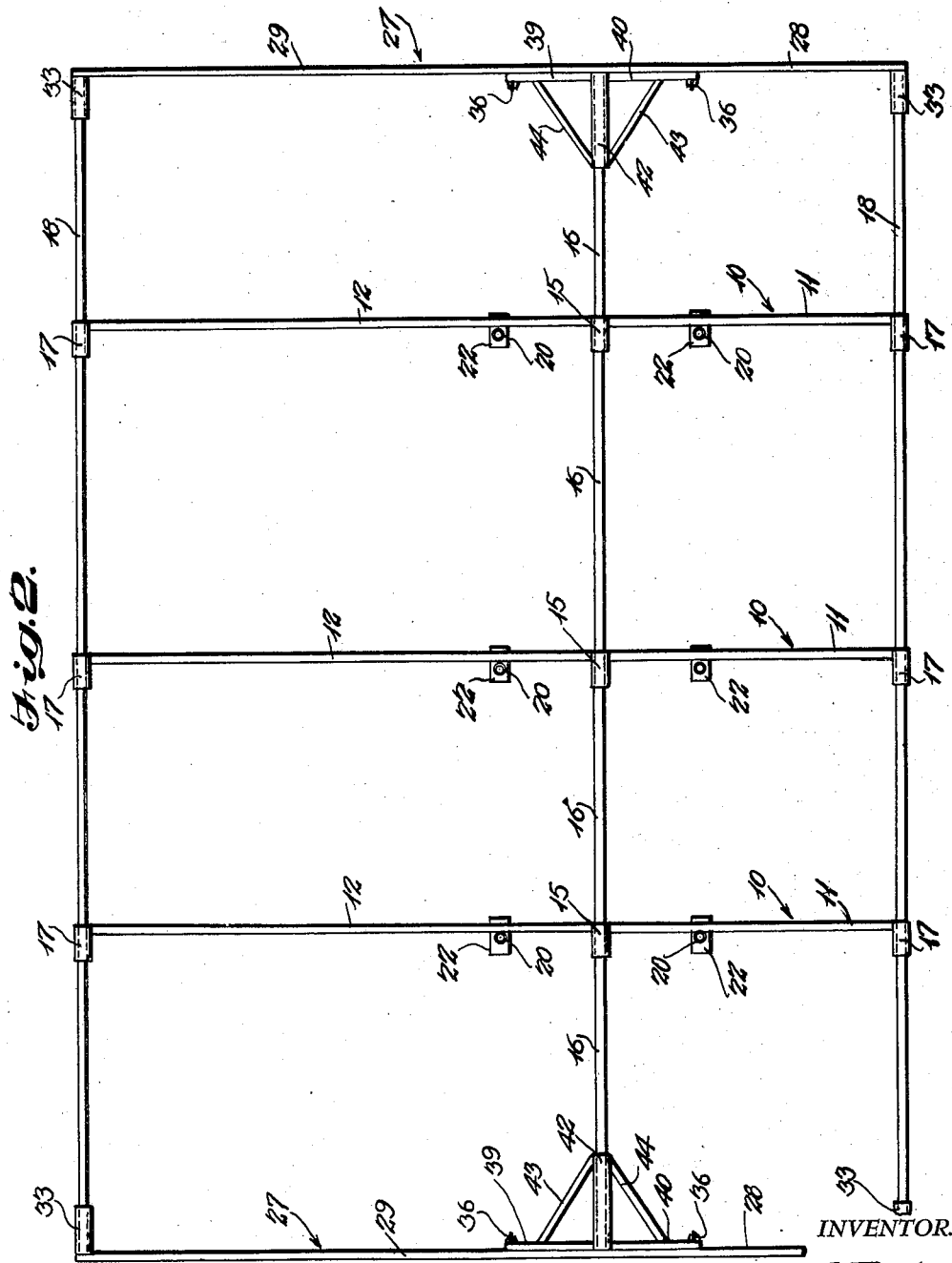

Oct. 18, 1949.
M. E. BISHOP
2,485,473
TRAILER SUPPORTED CANOPY
Filed Nov. 21, 1946
3 Sheets-Sheet 3
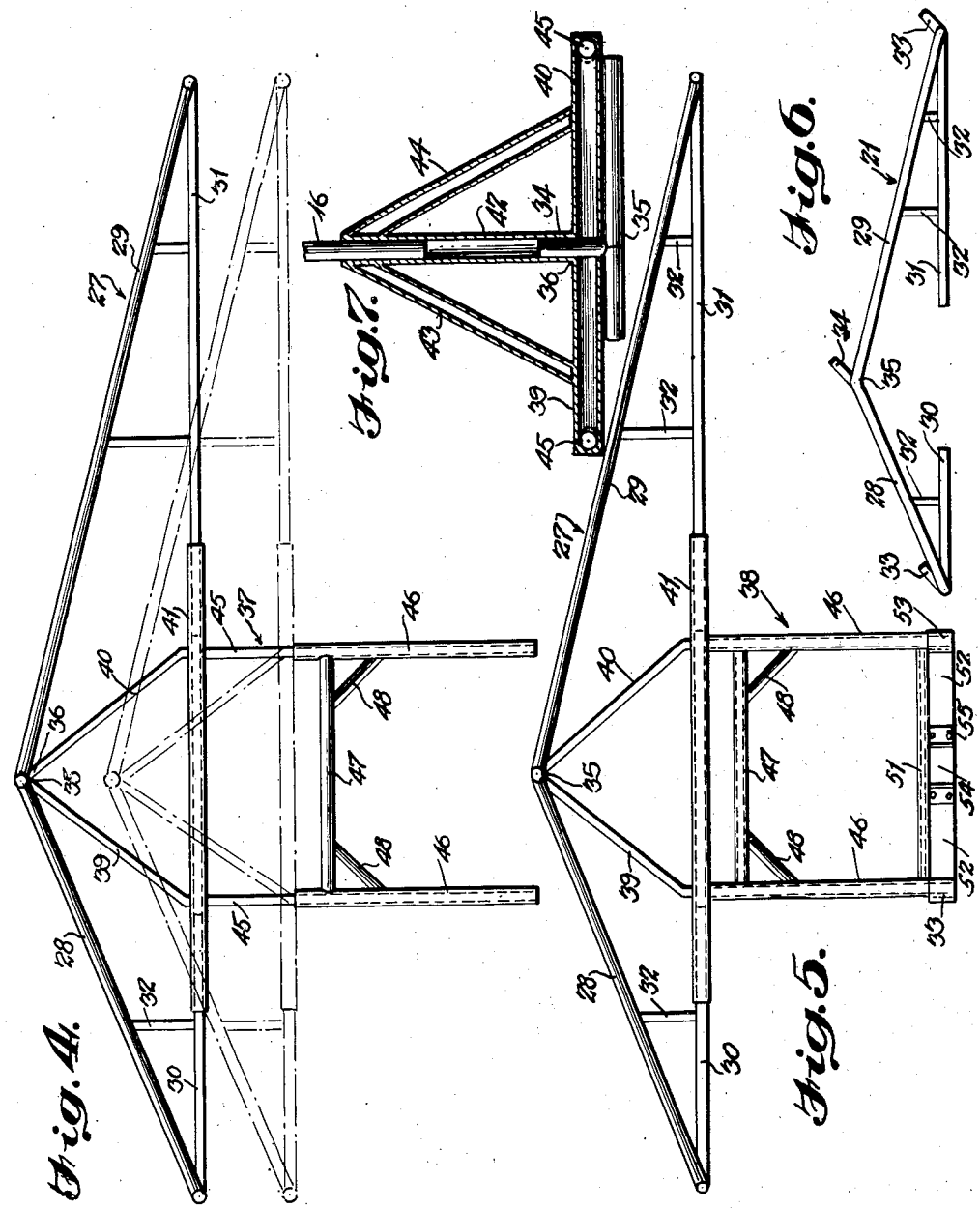
INVENTOR.
Maurice E. Bishop.
BY Victor J. Evans & Co.
ATTORNEYS Patented Oct. 18, 1949

2,485,473

UNITED STATES PATENT OFFICE 2,485,473

TRAILER SUPPORTED CANOPY

Maurice E. Bishop, Nashville, Tenn.

Application November 21, 1946, Serial No. 711,357

1 Claim. (Cl. 135—7.1)

This invention relates to a trailer supported canopy, and the primary object of the invention is to provide a support that will support the canopy in such a manner that it will provide a porch effect for a trailer, as well as a protection for the trailer during inclement weather, while the trailer is parked at some fixed locality.

An object of the invention is to provide a supported canopy that is adjustable in height, so that its height can be raised in relation to the height of the trailer on which it is supported.

Another object of the invention is to provide a supported canopy that is strong, durable and efficient in operation, and the support therefor can be easily installed on or removed from the trailer.

With the above and other objects and advantages in view, the invention consists of the novel details of construction, arrangement and combination of parts more fully hereinafter described, claimed and illustrated in the accompanying drawings in which:

Figure 1 is a side elevational view of the support for the canopy as attached to a trailer;

Figure 2 is a plan view of the support, per se;

Figure 3 is a transverse view of one of the movable supporting rafters of the frame;

Figure 4 is a transverse view of one of the fixed supporting end rafters;

Figure 5 is the same, showing the mounting means for the end rafters;

Figure 6 is a fragmentary perspective view of a rafter without the mounting means and Figure 7 is a fragmentary sectional view of a supporting base for the end rafter.

Referring more in detail to the drawings, the reference numeral 10 designates a supporting rafter, and in the figures there is shown three of these rafters in use, but the member used depends on the length of the trailer by which the invention is to be supported.

The rafters are substantially triangular in shape, having a short leg 11, and a long leg 12, with the base 13 secured to the legs intermediate their ends. Formed at the apex 14 of the rafter 10 is a tubular socket 15 and the ridge pole 16 is mounted in the sockets 15. At each end of the legs there is provided a socket 17 which is similar to the sockets 15, and the sockets 17 are adapted to receive the eaves poles 18. An inclined brace member 19 is secured to the socket 15 at the apex 14, and base 13, to strengthen the socket, and tubular members or sleeves 20 fixed to and depending from the legs 11 and 12 telescopically receive the rods 21 having the circular rectangular shaped plates 22 thereon, which rest on the roof of the trailer 23, and nuts and bolts 24 retain the rods 21 in the sleeves 20 in fixed position after the rafter has been adjusted for height. Diagonal braces 25, secured to the legs 11 and 12 and base 13 strengthen the rafters, as does the strut 26 connected to the leg 12 and brace 25.

At each end of the ridge and eaves poles, there is mounted a fixed rafter 27, having a short leg 28 and a long leg 29, and base sections 30 and 31 extending inwardly from the lower ends of the legs 28 and 29 respectively, and struts 32 secured to the legs and bases strengthen the rafters. At each lower end of the legs there is provided an inwardly extending socket 33 to receive the outer ends of the eaves poles 18, and an inwardly projecting stud 34 at the apex 35 of each rafter 27 is received in the apex 36 of the triangular rafter supporting frames 37 and 38 respectively, and each frame is the same except for the lower ends thereof, and will be so described.

The frames are substantially triangular in shape at the upper ends, having the equal legs 39 and 40 which are secured at their lower ends to the elongated base member 41, which is adapted to telescopically receive the inner ends of the bases 30 and 31 of the rafters 27. The apex 36 of the frames 37 and 38 has an inwardly extending socket 42 secured thereto, which receives the outer ends of the ridge pole 16, and angular braces 43 and 44 secured to the outer end of the socket 42 and base 41 support and brace the socket 42.

Depending from the base member 41 in line with the outer ends of the legs 39 and 40, are the uprights 45 which are telescopically received in the uprights 46 to form an adjustable supporting frame for the rafters. A cross bar 47 secured to the uprights adjacent their upper ends, together with inclined braces 48 secured to the uprights 46 and cross bar 47 brace and strengthen the uprights, and the uprights 46 of the frame 37 have inwardly extending feet 48 which are bolted to the frame 49 of the trailer 23 by bolts 50. The lower ends of the uprights 46 of the frame 38 are joined by a cross bar 51, and forwardly inclined brackets 52, having sockets 53 to receive the lower ends of the uprights are secured to the hitch 54 of the trailer by bolts 55.

Sockets 33 and uprights 46 are provided with nuts and bolts 56 for securing all elements in fixed relation to each other.

It is to be understood that a canopy is to be placed over the entire support, and that the canopy can then be supported on the top of the trailer.

The canopy can then be adjusted for height as previously described, to permit clearance for the opening of the trailer vents, and also to permit air to circulate between the trailer top and canopy, which air circulation will make the interior of the trailer more comfortable when parked in the sun.

The rafter 10 can be moved along the ridge and eaves poles to any position desired, and the end rafters can be removed to permit the long legs thereof to extend on either side of the trailer. When not in use, the frame can be disassembled and the removable parts thereof carried in the trailer, and when parked, the removable parts can be easily taken therefrom and assembled. Such disassembling comprises the removal of the rafters 10 and 27 and eaves rails 18, since the supporting frames 37 and 38 respectively will be slid downwardly until the ridge pole 16 rests on the top of the trailer. The rigid structure thus remaining on the trailer will not interfere in travelling, since the width of the trailer will compensate for the base member 41, and the ridge pole 16 will rest on the top of the trailer.

There has thus been provided a support for a canopy for a trailer that is durable and can provide many hours of pleasure by its use.

It is believed that the construction and method of assembly of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A support of the character described, for use with a trailer comprising a plurality of movable rafters, and fixed end rafters, a ridge pole and eaves poles joining said rafters to form a unit, means for supporting said movable rafters on the roof of the trailer, said means being telescopically adjustable to support said rafters at various distances above the roof of the trailer, sockets at the ends of said rafters for receiving said ridge poles and said eaves poles, said rafters being substantially triangular in shape having a long leg and a short leg, the long leg of said rafters extending beyond the sides of said trailer to form a canopy and telescopically adjustable means for supporting the end rafters on the frame of the trailer.

MAURICE E. BISHOP.

REFERENCES CITED

The following references are of record in the file of this patent:

UNITED STATES PATENTS

| Number | Name | Date |
| --- | --- | --- |
| 378,977 | Ryan | Mar. 6, 1888 |
| 1,836,060 | Barnes | Dec. 15, 1931 |
| 2,306,537 | Hamm | Dec. 29, 1942 |